(12) United States Patent
Willems et al.

(10) Patent No.: US 10,471,753 B2
(45) Date of Patent: Nov. 12, 2019

(54) PRE-TREATMENT COMPOSITION

(71) Applicant: Océ Holding B.V., Venlo (NL)

(72) Inventors: Guido G. Willems, Venlo (NL); Peter R. Markies, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/040,824

(22) Filed: Jul. 20, 2018

(65) Prior Publication Data

US 2018/0326770 A1 Nov. 15, 2018

Related U.S. Application Data

(63) Continuation of application No. PCT/EP2017/053377, filed on Feb. 15, 2017.

(30) Foreign Application Priority Data

Feb. 19, 2016 (EP) .................................. 16156500

(51) Int. Cl.
*B41M 5/00* (2006.01)
*C09D 11/54* (2014.01)
(Continued)

(52) U.S. Cl.
CPC ......... *B41M 5/0017* (2013.01); *C09D 11/033* (2013.01); *C09D 11/10* (2013.01);
(Continued)

(58) Field of Classification Search
CPC .......... B41M 5/00; C09D 11/38; C09D 11/54; C09D 11/10; C09D 11/36; C09D 11/03
(Continued)

(56) References Cited

U.S. PATENT DOCUMENTS

2009/0185019 A1\* 7/2009 Ogasawara ............ B41J 2/2114
347/100
2009/0311426 A1\* 12/2009 Nakazawa ............. B41J 2/2114
427/256
(Continued)

FOREIGN PATENT DOCUMENTS

EP 2 105 473 A1 9/2009
WO WO 2013/131924 A1 9/2013
(Continued)

OTHER PUBLICATIONS

International Search Report (PCT/ISA/210) issued in PCT/EP2017/053377, dated May 19, 2017.
(Continued)

*Primary Examiner* — Stephen D Meier
*Assistant Examiner* — Alexander D Shenderov
(74) *Attorney, Agent, or Firm* — Birch, Stewart, Kolasch & Birch, LLP

(57) ABSTRACT

Disclosed is a substantially water-free pre-treatment composition having at least one of an acid or an acid anhydride in an organic matrix. Also disclosed is a kit of parts having the pre-treatment composition and an ink composition that has an intrinsic inferior water fastness when printed, where the ink contains a compound that is soluble in alkaline environment (ink as such) and insoluble in a neutral and/or acidic environment. Also disclosed is a printing method for improving the water fastness of a print made with an ink that has intrinsically low water fastness, by using a pre-treatment composition as disclosed.

12 Claims, 5 Drawing Sheets

(51) Int. Cl.
    *C09D 11/033*     (2014.01)
    *C09D 11/36*     (2014.01)
    *C09D 11/10*     (2014.01)
    *C09D 11/38*     (2014.01)

(52) U.S. Cl.
    CPC .............. *C09D 11/36* (2013.01); *C09D 11/38* (2013.01); *C09D 11/54* (2013.01)

(58) Field of Classification Search
    USPC .......................................................... 347/95
    See application file for complete search history.

(56) References Cited

U.S. PATENT DOCUMENTS

| | | | |
|---|---|---|---|
| 2010/0055325 A1 | 3/2010 | Sakai et al. | |
| 2013/0176369 A1* | 7/2013 | Gotou | B41J 2/2107 347/100 |
| 2016/0339719 A1* | 11/2016 | Yano | B41J 11/0015 |

FOREIGN PATENT DOCUMENTS

| | | |
|---|---|---|
| WO | WO 2014/173763 A1 | 10/2014 |
| WO | WO 2015/177182 A1 | 11/2015 |

OTHER PUBLICATIONS

Written Opinion of the International Searching Authority (PCT/ISA/237) issued in PCT/EP2017/053377, dated May 19, 2017.

\* cited by examiner

PRE-TREATMENT COMPOSITION

CROSS REFERENCE TO RELATED APPLICATIONS

This application is a Continuation of PCT International Application No. PCT/EP2017/053377, filed on Feb. 15, 2017, which claims priority under 35 U.S.C. 119(a) to Patent Application No. 16156,500.7, filed in Europe on Feb. 19, 2016, all of which are hereby expressly incorporated by reference into the present application.

FIELD OF THE INVENTION

The present invention relates to a pre-treatment composition for use in aqueous ink jet printing processes.

BACKGROUND ART

It is known in the art to use pre-treatment of print media (e.g., paper) in aqueous ink jet printing in order to improve print quality, in particular, on machine coated print media. Known pre-treatment compositions comprise water and an aggregation agent for destabilizing and pinning pigment particles and/or for destabilizing of dispersed polymer particles (e.g. latex) in order to facilitate film formation. Examples of aggregation agents are also known in the art and comprise, but are not limited to, acidic compounds, (polyvalent) metal compounds and oligomeric organic polycations.

Aqueous inks comprising alkali soluble latices are also known in the art. Alkali soluble latices are in a dispersed state at low pH (acidic) and may be added to ink compositions in that state. When the pH of the inks is adjusted to a higher pH (alkaline), the alkali soluble latex resin dissolves (at least partly) in the ink composition as to form a polymer thickening agent in the ink, while maintaining or improving the jettability of the ink composition.

It is however a disadvantage of such ink compositions that once printed and dried, the prints are water sensitive (i.e., have an inferior water fastness) due to the solubility of the alkali soluble latex resin when reintroducing water to the printed surface.

When a known acidic pre-treatment composition is used in combination with an ink composition comprising an alkali soluble latex resin the above disadvantage can be overcome or at least mitigated. However, in order to achieve an acceptable water fastness, acidic pre-treatment compositions with very low pH may be required. A disadvantage of such low pH pre-treatment compositions is that they are corrosive towards materials used in printers and in particular in printheads. Thus, printer parts including printheads made of such materials may be affected or even permanently damaged when such printer parts come into contact with such strong (low pH) acidic pre-treatment compositions.

It is therefore an object of the present invention to provide a pre-treatment composition for improving the water fastness of printed matter made with aqueous ink compositions comprising alkali soluble latex resins that is non-corrosive with respect to used materials in the printer and without imparting the print quality.

SUMMARY OF THE INVENTION

In a first aspect of the present invention, this object can be partly achieved by providing a pre-treatment composition for use in combination with an aqueous alkaline ink composition comprising an alkali soluble latex resin and/or a latex resin having an acid number of between 15 mg KOH/g and 130 mg KOH/g, the pre-treatment composition comprising:
  an organic matrix comprising at least one organic solvent that is miscible with water;
  at least one selected from an acid or acid anhydride, which are soluble in the organic matrix,
wherein the pre-treatment composition is substantially free of water.

Due to the fact that a pre-treatment composition according to the present invention comprises acids or acid anhydrides or a mixture of acids and/or acid anhydrides solved in an organic matrix without water, the system is in principle neutral and non-corrosive. Acid anhydrides or mixtures thereof are preferred, because the acid functionality can only be restored upon contact with water. Therefore, in cases acid anhydrides are used (instead of acids) in a pre-treatment composition according to the present invention, traces of water will first react with the acid anhydride, initially without substantial acid dissociation. The pre-treatment composition according to the present invention is jettable and therefore can be applied by ink jet methods onto a receiving medium.

When an aqueous ink is printed on top of a pre-treated receiving medium according to the present invention, the acid is activated by dissolving in the aqueous ink layer or the acidic anhydride reacts with the water from the ink composition and in-situ forms an acidic pre-treatment primer on the receiving medium. An alkali soluble latex resin and/or a latex resin having an acid number of between 15 mg KOH/g and 130 mg KOH/g present in the ink composition is/are brought to its/their acidic (insoluble) state(s), such that the water fastness of the printed matter improves. Pigment particles present in the ink composition are also sensitive for destabilization at low pH, such that pinning of the pigment particles is promoted. The pre-treatment composition according to the present invention may therefore also prevent or at least mitigate (inter color) bleeding, de-wetting and coalescence.

The present invention may therefore provide a pre-treatment composition that is non-corrosive towards materials used in a printer, does not impart print quality and improves water fastness of the printed matter.

It is a further potential advantage of the pre-treatment composition according to the present invention that tot total water load (i.e., pretreatment composition and ink) on the surface of a print medium is significantly reduced, such that media deformation may be significantly reduced or even prevented.

It is yet a further potential advantage of the present invention that printed matter produced by using a pre-treatment composition according to the present invention in combination with an ink composition comprising an alkali soluble latex resin, can be easily recycled (de-inking) by reducing the water fastness of the printed matter by applying (e.g., rinsing, soaking, spraying, etc.) an alkaline substance (e.g., solution).

In an embodiment, the at least one organic solvent of the organic matrix is selected from the group consisting of: 2,5,7,10-tetra-oxa-undecane (TOU); isosorbide; dimethylether; n-butyl pyrrolidone (e.g., commercially available as TamiSolve™ NxG); 1-methyl-2-pyrrolidone; diethyleneglycoldimethylether; propylenecarbonate; dimethylsulfoxide; and dimethylformamide.

In an embodiment, when the pre-treatment composition contains the acid, the acid may be selected from the group consisting of p-toluene sulfonic acid; maleic acid; oxalic acid; tartaric acid; and oligo lactic acid and/or the acid anhydride is selected from the group consisting of diglycolic anhydride; benzoic anhydride; maleic anhydride, glutaric anhydride and succinic anhydride.

In an embodiment, the pre-treatment composition optionally comprises additives such as viscosity modifiers that solve in the organic matrix, e.g. polyvinyl pyrrolidone; poly(2-ethyl-2-oxazoline); and (dimethyl) polyethyleneglycols (PEG) in a molar mass range of 200-10000 g/mol.

It is preferred that solvents, binders and other additives that are used in combination with the acid and/or acid anhydride in a pre-treatment composition according to the present invention are non-reactive with the acid and acid anhydride.

It is preferred that solvents, binders and other additives that are used in combination with the acid and/or acid anhydride in a pre-treatment composition according to the present invention are aprotic compounds.

In another aspect, the present invention relates to a kit of parts comprising a pre-treatment composition according to the first aspect of the present invention and an aqueous ink composition comprising an alkali soluble latex resin and/or a latex resin having an acid number of between 15 mg KOH/g and 130 mg KOH/g, the ink composition having a pH of above 7. In case the ink composition comprises a latex resin (instead of or besides an alkali soluble latex), the acid number lies in said range, but is preferably above 30 mg KOH/g, more preferably above 50 mg KOH/g and even more preferably above 70 mg KOH/g.

In yet another aspect, the present invention relates to a method of printing comprising the steps of:
a) providing a substantially water free pre-treatment composition comprising an organic matrix comprising at least one organic solvent that is miscible with water and at least one selected from an acid or acid anhydride that is soluble in the organic matrix;
b) providing an aqueous ink composition comprising an alkali soluble latex resin and/or a latex resin having an acid number of between 15 mg KOH/g and 130 mg KOH/g, the ink composition having a pH of above 7;
c) providing a print medium;
d) applying the pre-treatment composition onto the print medium to provide a pre-treated print medium; and
e) printing an image with the aqueous ink composition onto the pre-treated print medium.

In an embodiment, the method further comprises the step of
f) drying of the pre-treated print medium obtained in step d.

In an embodiment, the method further comprises the step of
g) drying of the printed and pre-treated print medium obtained in step e.

In an embodiment, the method comprises steps f and g.

In an embodiment, the pre-treatment composition is applied with ink jet printing (step d).

In an embodiment, the pre-treatment composition is applied at room temperature.

One potential requirement for this is that the pre-treatment composition is jettable (liquid and having the right properties, such as a viscosity within the range specified for the use of a selected print head). However, the pre-treatment compositions according to the present invention may also be solid at room temperature and liquid at elevated temperature. Such compositions may be jetted at elevated temperature.

In an embodiment, the pre-treatment composition is applied to the print medium in step d with a coverage in a range between 15% and 85% of the surface area of the print medium, preferably a coverage between 25% and 80%, more preferably a coverage between 35% and 75%. The optimum coverage of the pre-treatment composition depends on at least the selected print medium and the spreading properties of the pre-treatment composition on said print medium.

Within the above ranges, an optimal water fastness of the printed matter may be obtained. The exact optimal range may be determined for each pre-treatment composition and ink combination.

BRIEF DESCRIPTION OF THE DRAWINGS

The present invention will become more fully understood from the detailed description given herein below and accompanying schematical drawings which are given by way of illustration only and are not limitative of the invention, and wherein.

DETAILED DESCRIPTION

Figure 1:
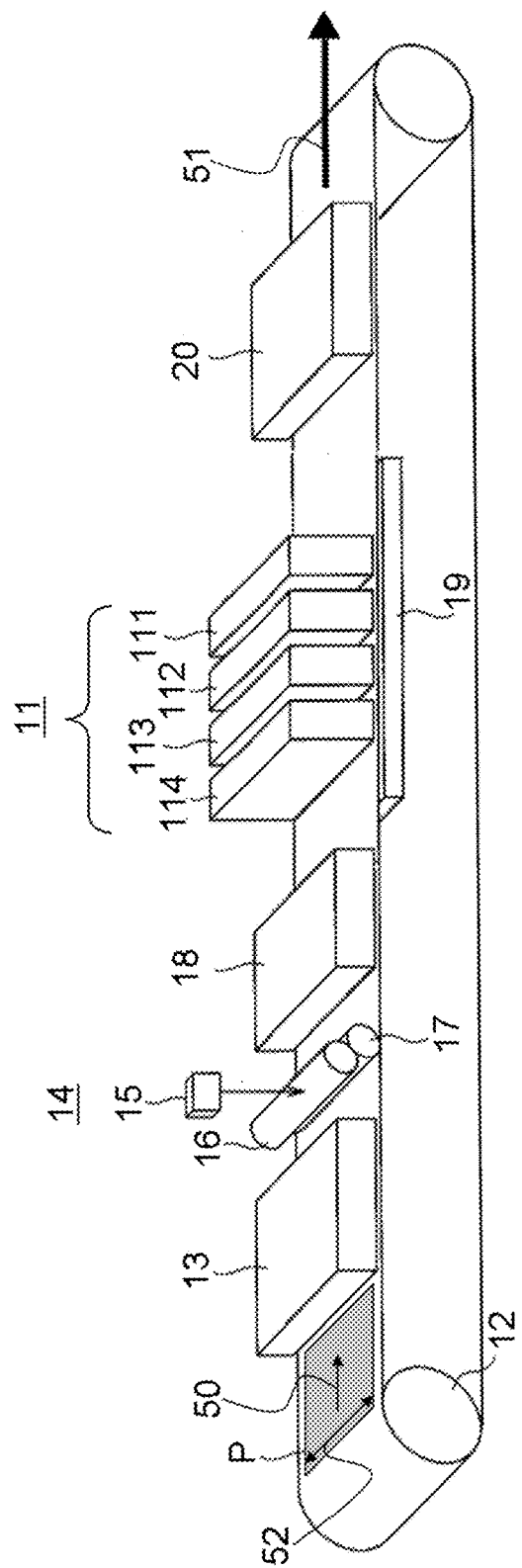
FIG. 1 shows a schematic representation of an inkjet printing system.

Pre-treatment Composition
Organic Matrix

The organic matrix comprises organic solvents that are miscible with water, in order to facilitate mixing of the ink composition with the pre-treatment composition to promote the reaction between the acid anhydride present in the pre-treatment composition and water present in the ink composition.

Suitable organic solvents to be used in a pre-treatment composition are in principle all solvents that do not react with acids and/or acid anhydrides, e.g., aprotic solvents.

Preferred classes of solvents are: ethers, acetals, pyrrolidone derivatives, (cyclic) esters.

Suitable examples of organic solvents are: 2,5,7,10-tetraoxa-undecane (TOU); Isosorbide; dimethylether; n-butyl pyrrolidone (e.g., commercially available as TamiSolve™ NxG); diethyleneglycoldimethylether; 1-methyl-2-pyrrolidone; propylenecarbonate; dimethylsulfoxide (DMSO); dimethylformamide (DMF).

Coagulation Agent

In principle all acids and acid anhydrides that can be solved in the selected organic matrix are suitable to be used in a pre-treatment composition according to the present invention.

Suitable acids to be used in a pre-treatment composition are: p-toluene sulfonic acid; maleic acid; oxalic acid; tartaric acid and oligo lactic acid.

Suitable acid anhydrides to be used in a pre-treatment composition are acid anhydrides that easily react with water to form acids, for example (but not limited to): diglycolic anhydride; benzoic anhydride; maleic anhydride, glutaric anhydride and succinic anhydride Further Optional Additives The pre-treatment composition according to the present invention may optionally comprise further additives such as anti-curl agents, viscosity modifiers and surfactants. In principle the additives are not limited to any kind or type, as long as they are compatible with the pre-treatment composition according to the present invention, and the intended effect of the use of a pre-treatment composition according to the present invention is not significantly affected.

Examples of suitable viscosity modifiers that solve in the organic matrix of the pre-treatment composition according to the present invention are (but are not limited to): polyvinyl pyrrolidone; poly(2-ethyl-2-oxazoline); and (dimethyl) polyethyleneglycols (PEG) in a molar mass range of 200-10000 g/mol. With respect to PEG it is noted that these compounds contain terminal —OH groups and are therefore capable of reacting with acids and acid anhydrides (to a small extent). Therefore, aprotic (e.g., dimethyl) derivatives of PEG are preferred.

Pre-treatment compositions according to the present invention may be liquid or solid at room temperature, such that they can be printed at room temperature or at elevated temperature, respectively. It is further noted that many components used in inks used in combination with a pre-treatment composition according to the present invention may be suitable to be used in said pre-treatment compositions, as long as the intended effect of the pre-treatment composition according to the present invention is at least partly attained. Ink components are disclosed in the next sections.

Ink Compositions

The pre-treatment composition according to the present invention can be used in combination with ink compositions, which may comprise an alkali soluble latex resin, a latex resin, a water-dispersible colorant, water, a cosolvent, a surfactant and optionally other additives.

(Alkali Soluble) Latex Resin

In principle all latex compositions that are compatible with the other components in the ink are suitable for use in ink compositions. However, in the context of the present invention, which relates to a pre-treatment composition for improving the water fastness of aqueous (latex) ink compositions, the maximum effect of the invention is obtained when latices are used that do not intrinsically provide sufficient water fastness, such as alkali soluble latex resins used in alkaline ink compositions and latex compositions wherein the latex resin has a relatively high acid number. It is therefore a potential advantage of the present invention that the range of suitable latices for use in an ink composition is increased, while maintaining or even improving the water fastness of printed matter made with such inks.

The inkjet ink according to the present invention contains a water-dispersible resin in view of the pigment fixability to recording media. As the water-dispersible resin, a water-dispersible resin excellent in film formability (image formability) and having high water repellency, high waterfastness, and high weatherability is useful in recording images having high waterfastness and high image density (high color developing ability). Examples of the water-dispersible resin include synthetic resins and natural polymer compounds.

Examples of the synthetic resins include polyester resins, polyurethane resins, polyepoxy resins, polyamide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins.

Examples of the natural polymer compounds include celluloses, rosins, and natural rubbers.

In an embodiment, the water dispersible resin used in the present invention may be made of a resin having a water soluble functional group such as a carboxylic group or a sulfonic group.

Examples of commercially available water-dispersible resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-1131, NeoCryl A-2091, NeoCryl A-550, NeoCryl BT-101, NeoCryl SR-270, NeoCryl XK-52, NeoCryl XK-39, NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-36, NeoCryl XK-15, NeoCryl X-151, NeoCryl XK205, NeoCryl XK-232, NeoCryl XK-234, NeoCryl XK-237, NeoCryl XK-238-NeoCryl XK-86, NeoCryl XK-90 and NeoCryl XK-95 However, the water-dispersible resin emulsion is not limited to these examples.

As the fluorine-based resin, fluorine-based resin fine particles having a fluoroolefin unit are preferred. Of these, fluorine-containing resin fine particles containing a fluoroolefin unit and a vinylether unit are particularly preferable. The fluoroolefin unit is not particularly limited and may be suitably selected in accordance with the intended use. Examples thereof include —$CF_2CF_2$—, —$CF_2CF(CF_3)$—, and —$CF_2CFCl$—.

The vinylether unit is not particularly limited and may be suitably selected in accordance with the intended use. Examples thereof include —$C(R_a)HC(OR_b)$—; wherein $R_a$ is a hydrogen atom or a methyl group; and wherein $R_b$ may be selected from the group consisting of —$CH_2R_c$, —$C_2H_4R_c$, —$C_3H_6R_c$, —$C_4H_8R_b$ and —$C_5H_{10}R_c$, wherein $R_c$ is selected from the group consisting of a hydrogen atom (—H), an hydroxy group (—OH) or a carboxylic acid group (—COOH)

As the fluorine-containing vinylether-based resin fine particles containing a fluoroolefin unit and a vinylether unit, an alternated copolymer, in which the fluoroolefin unit and the vinylether unit are alternately copolymerized, is preferable. As such fluorine-based resin fine particles, a suitably synthesized compound may be used and a commercially available product may be used. Examples of the commercially available products include FLUONATE FEM-500 and FEM-600, DICGUARD F-52S, F-90, F-90M, F-90N and AQUAFURFURAN TE-5A produced by Dainippon Ink Chemical Industries Co., Ltd.; LUMIFLON FE4300, FE4500, FE4400, ASAHI GUARD AG-7105, AG-950, AG-7600, AG-7000, and AG-1100 produced by Asahi Glass Co., Ltd.

In an embodiment, the ink composition according to the present invention comprises two or more water-dispersible resins selected from the above cited synthetic resins, synthetic copolymer resins and natural polymer compounds in admixture with each other.

Examples of alkali soluble latices are: Carboset GA2363E, Carboset GA1594, Carboset CR510 all obtained from Lubrizol.

Examples of latices are: Neocryl BT9, Neocryl BT107s, Neocryl XK205 (obtained from DSM Neoresins, acid number 17 mg KOH/g); Neocryl A662 (obtained from DSM Neoresins, acid number 10 mg KOH/g). TacklacW5661 obtained from Mitsui.

Water-Dispersible Colorant

A water-dispersible colorant may be a pigment or a mixture of pigments, a dye or a mixture of dyes or a mixture comprising pigments and dyes, as long as the colorant is water-dispersible.

In the inkjet ink according to the present invention, a pigment is primarily used as a water-dispersible colorant in view of the weatherability, and, for the purpose of controlling color tone, a dye may be contained within the range not impairing the weatherability. The pigment is not particularly limited and may be suitably selected in accordance with the intended use.

Examples of the pigment usable in the present invention include those commonly known without any limitation, and either a water-dispersible pigment or an oil-dispersible pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination.

As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101 (colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 144, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), C.I. Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1, C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are employed, it is preferable that the following pigments are employed individually or in combination thereof. Examples of employable pigments include: C.I. Pigment Red 209, 224, 177, and 194, C.I. Pigment Orange 43, C.I. Vat Violet 3, C.I. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

The amount of the water-insoluble pigment contained in the ink composition, as a solid content, is preferably 0.5 weight % to 15 weight %, more preferably 0.8 weight % to 10 weight %, and even more preferably between 1 weight % and 6 weight %, based upon the total weight of the ink composition. When the amount of the water-insoluble pigment is less than 0.5 weight %, the color developing ability and image density of the ink may degrade. When it is more than 15 weight %, unfavorably, the viscosity of the ink is increased, causing a degradation in ink ejection stability.

Solvent

Water is cited as an environmentally friendly and hence desirable solvent. In the present invention, the content of water to the whole ink composition is preferably from 20 weight % to 80 weight %. It is more preferable that the content of water is from 30 weight % to 75 weight %, even more preferable from 40 weight % to 70 weight %, based upon the total weight of the ink composition.

Cosolvent

As a solvent of the ink, for the purposes of improving the ejection property of the ink or adjusting the ink physical properties, the ink preferably contains a water soluble organic solvent in addition to water. As long as the effect of the present invention is not damaged, there is no restriction in particular in the type of the water soluble organic solvent.

Examples of the water-soluble organic solvent include polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate.

Examples of the solvent include: glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylol-propane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol monopropyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanediol and 1,2-butanediol.

Specific examples of the polyhydric alcohols include dipropylene glycol (bp 232° C.), 1,5-pentanediol (bp 242° C.), 3-methyl-1,3-butanediol (bp 203° C.), propylene glycol (bp 187° C.), 2-methyl-2,4-pentanediol (bp 197° C.), ethylene glycol (bp 196° C.-198° C.), tripropylene glycol (bp 267° C.), hexylene glycol (bp 197° C.), polyethylene glycol (viscosity-controlled liquid to solid), polypropylene glycol (bp 187° C.), 1,6-hexanediol (bp 253° C.-260° C.), 1,2,6-hexanetriol (bp 178° C.), trimethylolethane (solid, melting point (mp) 199° C.-201° C.), and trimethylolpropane (solid, mp 61° C.).

Examples of the polyhydric alcohol alkyl ethers include ethylene glycol monoethylether (bp 135° C.), ethylene glycol monobutylether (bp 171° C.), diethylene glycol monomethylether (bp 194° C.), diethylene glycol monoethylether (bp 197° C.), diethylene glycol monobutylether (bp 231° C.), ethylene glycol mono-2-ethylhexylether (bp 229° C.), and propylene glycol monoethylether (bp 132° C.).

Examples of the polyhydric alcohol aryl ethers include ethylene glycol monophenyl ether (bp 237° C.), and ethylene glycol monobenzyl ether.

Examples of the nitrogen-containing heterocyclic compounds include 2-pyrrolidone (bp 250° C., mp 25.5° C., ewc 47% by mass-48% by mass), N-methyl-2-pyrrolidone (bp 202° C.), 1,3-dimethyl-2-imidazolidionone (bp226° C.), ε-caprolactam (bp 270° C.), and γ-butyrolactone (bp 204° C.-205° C.).

Examples of the amides include formamide (bp 210° C.), N-methylformamide (bp 199° C.-201° C.), N,N-dimethylformamide (bp 153° C.), and N,N-diethylformamide (bp 176° C.-177° C.).

Examples of the amines include monoethanolamine (bp 170° C.), dimethanolamine (bp 268° C.), triethanolamine (bp 360° C.), N,N-dimethylmonoethanolamine (bp 139° C.), N-methyldiethanolamine (bp 243° C.), N-methylethanolamine (bp 159° C.), N-phenylethanolamine (bp 282° C.-287° C.), 3-aminopropyl diethylamine (bp 169° C.), N-ethyldiethanolamine, N,N-diethylmonoethanolamine, tripropanolamine, 2-amino-2-methyl-1-propanol, N-ethylmonoethanolamine, N,N-di-n-butylmonoethanolamine, diisopropanolamine, N-n-butylmonoethanolamine, N-n-butyldiethanolamine and diglycolamine.

Examples of the sulfur-containing compounds include dimethylsulfoxide (bp 139° C.), sulfolane (bp 285° C.), and thiodiglycol (bp 282° C.).

As other solid water-soluble organic solvents, saccharides are preferable. Examples of the saccharides include monosaccharides, disaccharides, oligosaccharides (including triaccharides and tetrasaccharide), and polysaccharides.

Specific examples thereof include glucose, mannose, fructose, ribose, xylose, arabinose, galactose, maltose, cellobiose, lactose, sucrose, trehalose, and maltotriose. Here, the above-mentioned polysaccharides mean broad sense-saccharides, which may include substances existing widely in nature, such as orcyclodextrin and cellulose. Derivatives of these saccharides include reducing sugars of saccharides (for example, sugar alcohol, which is expressed by the general formula: $HOCH_2(CHOH)_nCH_2OH$, wherein n is an integer of 2 to 5), oxidized sugars (for example, aldonic acids and uronic acids), amino acids, and thio acids. Among these, sugar alcohol is preferable. Specific examples of sugar alcohol include maltitol and sorbitol.

In an embodiment, a mixture of the water-soluble organic solvents may be comprised in an ink composition according to the present invention. The individual organic solvents preferably being present in an amount of 1 weight % to 50 weight %, more preferably in an amount of 1 weight % to 40 weight %, even more preferably in an amount of 1 weight % to 25 weight %, relative to the total ink composition.

In an embodiment, the mixture of water-soluble organic solvents comprised in the ink composition may be used to optimize the stability (reliability) of an ink composition comprising such a mixture of water-soluble organic solvents and to improve print quality, e.g. solve or at least mitigate problems such as streakiness and/or coalescence and/or puddling and/or dewetting, in particular on apolar media, which are bound to surface tension-related driving forces occurring during the spreading of an ink droplet onto the media or during the drying of the ink.

In an embodiment, the ink composition comprises at least one oligomeric or polymeric cosolvent, in particular at least one selected from the group consisting of polyethylene glycols and polyethylene glycol (di)methyl ethers as defined above. An additional advantage of such cosolvents is that they provide a viscosity increase to printed ink drops upon drying (due to evaporation of water). Such a viscosity increase prevents a spreading ink drop from coalescing with neighboring ink drops.

Print artifacts such as puddling and dewetting are prevented or at least mitigated by using such oligomeric and/or polymeric cosolvents in the ink composition. An additional advantage of this embodiment is that media curling is effectively reduced.

Oligomeric and polymeric cosolvents are preferably present in an amount of between 0 weight % and 30 weight %, more preferably between 2 weight % and 27 weight % and even more preferably between 5 weight % and 25 weight %, based upon the total weight of the ink composition.

The total amount of the water-soluble organic solvent contained in the ink composition is not particularly limited. It is, however, preferably 0 weight % to 75 weight %, and more preferably 10 weight % to 70 weight %, and even more preferably 15 weight % to 60 weight % with respect to the total ink composition. When the amount of the water-soluble organic solvent is more than 80 weight %, the drying times of the ink compositions are too long. When the amount is less than 10 weight %, water in the ink compositions may evaporate more quickly, which may significantly reduce the stability of the ink composition.

A mass ratio of the water-dispersible colorant to the water-soluble organic solvent in the inkjet ink affects the ejection stability of ink ejected from an inkjet head. For example, when the addition amount of the water-soluble organic solvent is low regardless of high solid content of the water-dispersible colorant, evaporation of water near the ink meniscus of nozzles proceeds, and ejection defects may be caused. The total amount of the water-soluble organic solvent contained in the ink composition is preferably 20 weight % to 50 weight %, and more preferably 20 weight % to 45 weight %, based upon the total weight of the ink composition. When amount of the water-soluble organic solvent is less than 20 weight %, the ejection stability may degrade and waste ink may adhere to instruments used to maintain the ink ejection apparatus. In contrast, when the amount of the water-soluble organic solvent is more than 50 weight %, the dryness of ink printed on paper may degrade, and further the quality of characters printed on regular paper may degrade.

In an embodiment, an amino alcohol, in particular a N-alkyl-dialkanolamine, is used as a cosolvent in a small amount, i.e. less than 3 weight %, preferably less than 2 weight %, more preferably around 0.5 weight % with respect to the total ink composition. In such an ink formulation, the total fraction of stabilizing cosolvents can be significantly reduced (e.g. from 40 weight % to between 20 weight % and 30 weight %) without compromising the ink stability (in the inkjet head) and spreading properties on a receiving medium.

An ink composition according to the present embodiment preferably comprises a total amount of cosolvents of between 0 weight % and 40 weight %, preferably between 10 weight % and 35 weight %, more preferably between 20 weight % and 30 weight %. Examples of suitable amino alcohols are: triethanolamine, N-metyldiethanolamine, N-ethyldiethanolamine, N-n-butyl-monoethanolamine and N-n-butyl-diethanolamine.

Surfactants

It is preferable that the ink of the present invention contains a surfactant in order to improve an ink ejection property and/or the wettability of the surface of a recording medium, and the image density and color saturation of the image formed and reducing white spots therein. To improve the spreading of the ink on the surface of recording medium and to reduce puddling, it is preferable to adjust the dynamic surface tension (measured at 10 Hz) of the ink composition to 35 mN/m or lower, preferably to 34 nN/m or lower, more preferably to 33 mN/m or lower, even more preferably to 32 mN/m or lower by the surfactant. The static surface tension of the ink composition is preferably below 30 mN/m (measured at 0.1 Hz).

Examples of surfactants are not specifically limited. The following can be cited.

Examples of the surfactant include nonionic surfactants, cationic surfactants, anionic surfactants, amphoteric surfactants, in particular betaine surfactants, silicone surfactants, and fluorochemical surfactants. Particularly, at least one selected from acetylene surfactants, silicone surfactants and fluorochemical surfactants capable of reducing the surface tension to 30 mN/m or lower is preferably used.

Examples of a cationic surfactant include: aliphatic amine salts, aliphatic quaternary ammonium salts, benzalkonium salts, benzethonium chloride, pyridinium salts, imidazolinium salts.

Examples of an anionic surfactant include: polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutamate, an acylated peptide, an alkylsulfonic acid salt, an alkylbezenesulfonic acid salt, an alkylnaphthalene-sulfonic acid salt, a dialkylsulfo succinate (e.g. sodium dioctyl sulfosuccinate (DSS); alternative names: docusate sodium, Aerosol OT and AOT), alkylsulfo acetate, α-olefin sulfonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a monoglysulfate, an aliphatic acid alkylolamido sulfate salt, an alkyl ether phosphate salt and an alkyl phosphate salt.

Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an acetyleneglycol, an ethoxylated acetylene glycol, acetylene alcohol.

It is preferable that a pad of these surfactants is furthermore substituted with a fluorine atom or a silicon atom from a viewpoint of reducing the surface tension.

As the fluorochemical surfactant, a surfactant having 2 to 16 fluorine-substituted carbon atoms is preferred, and a surfactant having 4 to 16 fluorine-substituted carbon atoms is more preferred. When the number of fluorine-substituted carbon atoms is less than 2, the effect peculiar to a fluorochemical surfactant may not be obtained. When it is more than 16, degradation in storage stability etc. may arise.

Examples of the fluorochemical surfactants include nonionic fluorochemical surfactants, anionic fluorochemical surfactants, and amphoteric fluorochemical surfactants.

Examples of the nonionic fluorochemical surfactants include perfluoroalkyl phosphoric acid ester compounds, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property.

As the fluorochemical surfactants, commercially available products may be used.

Examples of the commercially available products include SURFLON S-HI, S-112, S-113. S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink Chemical Industries Co., Ltd.), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-136A, PF-156A, PF-151N, PF-154, and PF-159 (all of which are produced by OMNOVA Solutions Inc.). Among these, ZONYL FS-300 (produced by E. I. du Pont de Nemours and Company), FT-110, FT-250, FT-251, FT-400S, FT-150, FT-400SW (produced by Neos Company Limited), and POLYFOX PF-151N (produced by OMNOVA Solutions Inc.) are preferable in that they are excellent in print quality, particularly in color developing ability and in dye-leveling property.

The silicone surfactant is not particularly limited and may be suitably selected in accordance with the intended use.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants.

The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

The polyether-modified silicone surfactant is not particularly limited and may be suitably selected in accordance with the intended use. Examples thereof include a compound in which a polyalkylene oxide structure represented by Formula 1 is induced in Si portion side chain of dimethyl polysiloxane.

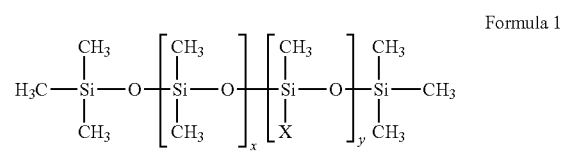

Formula 1 wherein $X = -R(C_2H_4O)_a(C_3H_6O)_bR'$

In Formula 1, x, y, a and b are each an integer; R represents an alkyl group, and R' represents an alkylene group.

As the polyether-modified silicone surfactant, commercial products may be used.

Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348, BYK 349, BYK 3455, BYK-387 (produced by BYK Chemie GmbH); Tegowet 240, Tegowet 245, Tegowet 250, Tegowet 260 (produced by Evonik); Silwet L-77 (produced by Sabic).

All surfactants mentioned in this section may be used solely, or they may be used in combination of the plural.

In an embodiment, a surfactant may be selected from the group consisting of dialkyl sulfosucinate salts, such as sodium dioctyl sulfosuccinate (AOT), ethoxylated acetylene glycols like Dynol 607 (Air Products) and combinations thereof. These surfactants are capable of reducing the dynamic surface tension of an aqueous latex ink composition according to the present invention to below 35 mN/m. sodium dioctyl sulfosuccinate (AOT) can give a very low dynamic surface tension at 10 Hz (below 30 mN/m). However, when used in higher amounts, the print quality may be compromised due to dewetting. An alternative is an ethoxylated acetylene glycol like Dynol 607.

Ethoxylated acetylene glycols have a general structure as shown in Formula 2.

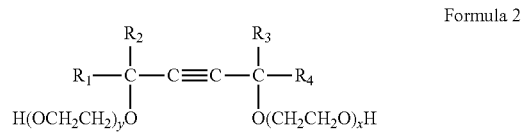

Formula 2 wherein $R_1$ and $R_4$ are the same or different alkyl radicals having from 3-10, preferably from 3-6 carbon atoms, preferably $R_1$ and $R_4$ are the same and $R_2$ and $R_3$ are the same or different and selected from methyl and ethyl, preferably both $R_2$ and $R_3$ are methyl and x and y are both integers and have a sum in the range of between 1 and 60.

Specific examples of ethoxylated acetylene glycols are ethoxylated 3-methyl-1-nonyn-3-ol, ethoxylated 7,10-dimethyl-8-hexadecyne-7,10-diol, ethoxylated 4,7-dimethyl-5-decyne-4,7-diol, ethoxylated 2,4,7,9-tetramethyl-5-decyne-4,7-diol, and ethoxylated 2,5,8,11-tetramethyl-6-dodecyne-5,8-diol. These can be used in combination with each other.

Print Media

The range of print media that can be printed with the above pre-treatment composition and ink compositions are not limited to any kind. Of particular interest are plain papers and machine coated (i.e., off-set coated) papers that are known in the art.

Printing Process

A printing process in which the inks according to the present invention may be suitably used is described with reference to the appended drawings shown in FIG. 1 and FIG. 2. FIGS. 1 and 2 show schematic representations of an inkjet printing system and an inkjet marking device, respectively.

FIG. 1 shows that a sheet of a receiving medium, in particular a machine coated medium, P, is transported in a direction for conveyance as indicated by arrows 50 and 51 and with the aid of transportation mechanism 12. Transportation mechanism 12 may be a driven belt system comprising one (as shown in FIG. 1) or more belts. Alternatively, one or more of these belts may be exchanged for one or more drums. A transportation mechanism may be suitably configured depending on the requirements (e.g., sheet registration accuracy) of the sheet transportation in each step of the printing process and may hence comprise one or more driven belts and/or one or more drums. For a proper conveyance of the sheets of receiving medium, the sheets need to be fixed to the transportation mechanism. The way of fixation is not particularly limited and may be selected from electrostatic fixation, mechanical fixation (e.g., clamping) and vacuum fixation. Of these vacuum fixation is preferred.

The printing process as described below comprises of the following steps: media pre-treatment, image formation, drying and fixing and optionally post treatment.

Media Pre-treatment

To improve the spreading and pinning (i.e., fixation of pigments and water-dispersed polymer particles) of the ink on the receiving medium, in particular on slow absorbing media, such as machine coated media, the receiving medium may be pretreated, i.e., treated prior to printing an image on the medium. The pre-treatment step may comprise one or more of the following:

preheating of the receiving medium to enhance spreading of the used ink on the receiving medium and/or to enhance absorption of the used ink into the receiving medium;

primer pre-treatment for increasing the surface tension of receiving medium in order to improve the wettability of the receiving medium by the used ink and to control the stability of the dispersed solid fraction of the ink composition (i.e., pigments and dispersed polymer particles). Primer pre-treatment may be performed in the gas phase, e.g. with gaseous acids such as hydrochloric acid, sulfuric acid, acetic acid, phosphoric acid and lactic acid, or in the liquid phase by coating the receiving medium with a pre-treatment liquid. The pre-treatment liquid may comprise water as a solvent, one or more cosolvents, additives such as surfactants and at least one compound selected from a polyvalent metal salt, an acid and a cationic resin;

corona or plasma treatment.

Primer Pre-treatment

As an application way of the pre-treatment liquid, any conventionally known methods can be used. Specific examples of an application way include: a roller coating, an ink-jet application, a curtain coating and a spray coating. There is no specific restriction in the number of times with which the pre-treatment liquid is applied. It may be applied at one time, or it may be applied in two times or more. Application in two times or more may be preferable, since cockling of the coated printing paper can be prevented and the film formed by the surface pre-treatment liquid will produce a uniform dry surface having no wrinkle by applying in 2 steps or more.

Especially a roller coating (see 14 in FIG. 1) method is preferable because this coating method does not need to take into consideration of ejection properties and it can apply the pre-treatment liquid homogeneously to a recording medium. In addition, the amount of the applied pre-treatment liquid with a roller or with other means to a recording medium can be suitably adjusted by controlling: the physical properties of the pre-treatment liquid; and the contact pressure of a roller in a roller coater to the recording medium and the rotational speed of a roller in a roller coater which is used for a coater of the pre-treatment liquid. As an application area of the pre-treatment liquid, it may be possible to apply only to the printed portion, or to the entire surface of both the printed portion and the non-printed portion. However, when the pre-treatment liquid is applied only to the printed portion, unevenness may occur between the application area and a non-application area caused by swelling of cellulose contained in the coated printing paper with the water in the pre-treatment liquid followed by drying. Then, from the viewpoint of drying uniformly, it is preferable to apply a pre-treatment liquid to the entire surface of a coated printing paper, and roller coating can be preferably used as a coating method to the whole surface. The pre-treatment liquid may be an aqueous pre-treatment liquid.

Corona or Plasma Treatment

Corona or plasma treatment may be used as a pre-treatment step by exposing a sheet of a receiving medium to corona discharge or plasma treatment. In particular when used on media like polyethylene (PE) films, polypropylene (PP) films, polyethyleneterephthalate (PET) films and machine coated media, the adhesion and spreading of the ink can be improved by increasing the surface energy of the media. With machine coated media, the absorption of water can be promoted which may induce faster fixation of the image and less puddling on the receiving medium. Surface properties of the receiving medium may be tuned by using different gases or gas mixtures as medium in the corona or plasma treatment. Examples are air, oxygen, nitrogen, carbon dioxide, methane, fluorine gas, argon, neon and mixtures thereof. Corona treatment in air is most preferred.

FIG. 1 shows that the sheet of receiving medium P may be conveyed to and passed through a first pre-treatment module 13, which module may comprise a preheater, for example a radiation heater, a corona/plasma treatment unit, a gaseous acid treatment unit or a combination of any of the above. Optionally and subsequently, a predetermined quantity of the pre-treatment liquid is applied on the surface of the receiving medium P at pre-treatment liquid applying member 14. Specifically, the pre-treatment liquid is provided from storage tank 15 of the pre-treatment liquid to the pre-treatment liquid applying member 14 composed of double rolls 16 and 17. Each surface of the double rolls may be covered with a porous resin material such as sponge. After providing the pre-treatment liquid to auxiliary roll 16 first, the pre-treatment liquid is transferred to main roll 17, and a predetermined quantity is applied on the surface of the receiving medium P. Subsequently, the coated printing paper P on which the pre-treatment liquid was supplied may optionally be heated and dried by drying member 18 which is composed of a drying heater installed at the downstream position of the pre-treatment liquid applying member 14 in order to decrease the quantity of the water content in the pre-treatment liquid to a predetermined range. It is preferable to decrease the water content in an amount of 1.0 weight % to 30 weight % based on the total water content in the provided pre-treatment liquid provided on the receiving medium P.

To prevent the transportation mechanism 12 being contaminated with pre-treatment liquid, a cleaning unit (not shown) may be installed and/or the transportation mechanism may be comprised multiple belts or drums as described above. The latter measure prevents contamination of the upstream parts of the transportation mechanism, in particular of the transportation mechanism in the printing region.

Image Formation

Image formation is performed in such a manner that, employing an inkjet printer loaded with inkjet inks, ink droplets are ejected from the inkjet heads based on the digital signals onto a print medium.

Although both single pass inkjet printing and multi pass (i.e. scanning) inkjet printing may be used for image formation, single pass inkjet printing is preferably used since it is effective to perform high-speed printing. Single pass inkjet printing is an inkjet recording method with which ink droplets are deposited onto the receiving medium to form all pixels of the image by a single passage of a receiving medium underneath an inkjet marking module.

In FIG. 1, 11 represents an inkjet marking module comprising four inkjet marking devices, indicated with 111, 112, 113 and 114, each arranged to eject an ink of a different color (e.g. Cyan, Magenta, Yellow and blacK). The nozzle pitch of each head is e.g. about 360 dpi. In the present invention, "dpi" indicates a dot number per 2.54 cm.

Figure 2A:
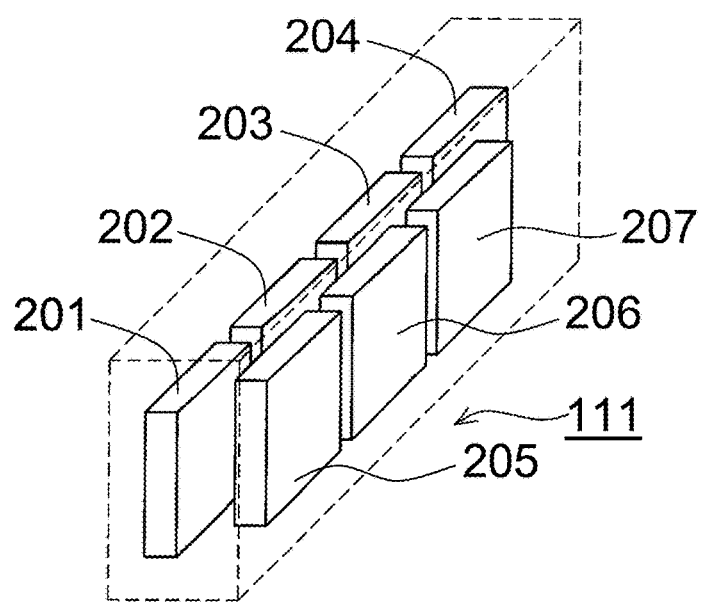
FIG. 2A, FIG. 2B, FIG. 2C respectively show a schematic representation of an inkjet marking device: A) and B) assembly of inkjet heads; C) detailed view of a part of the assembly of inkjet heads.
Figure 2B:
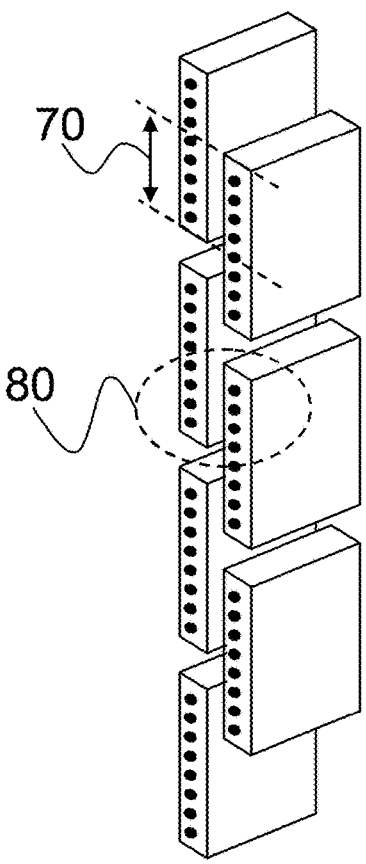
Figure 2C:
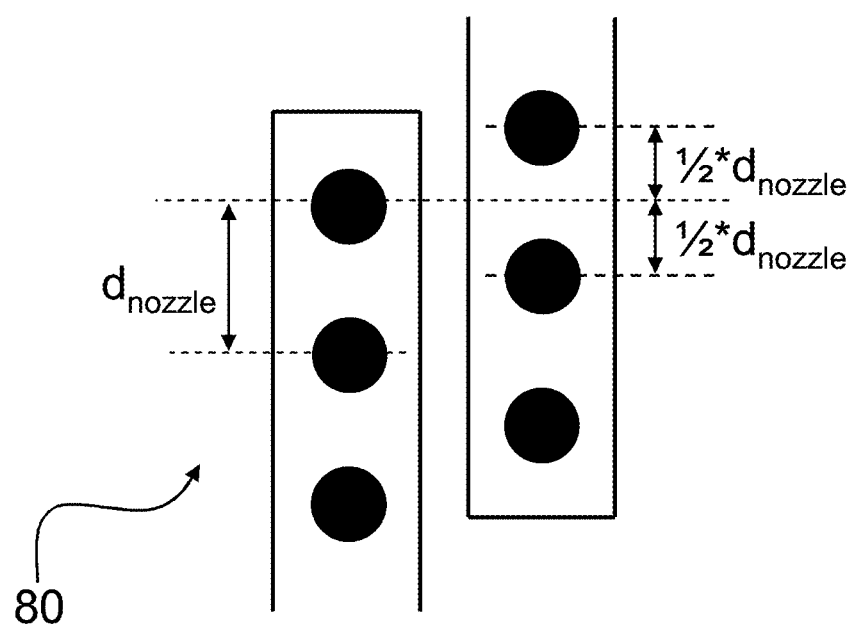

An inkjet marking device for use in single pass inkjet printing, 111, 112, 113, 114, has a length of at least the width of the desired printing range, indicated with double arrow 52, the printing range being perpendicular to the media transport direction, indicated with arrows 50 and 51. The inkjet marking device may comprise a single printhead having a length of at least the width of said desired printing range. The inkjet marking device may also be constructed by combining two or more inkjet heads, such that the combined lengths of the individual inkjet heads cover the entire width of the printing range. Such a constructed inkjet marking device is also termed a page wide array (PWA) of printheads. FIG. 2A shows an inkjet marking device 111 (112, 113, 114 may be identical) comprising 7 individual inkjet heads (201, 202, 203, 204, 205, 206, 207) which are arranged in two parallel rows, a first row comprising four inkjet heads (201-204) and a second row comprising three inkjet heads (205-207) which are arranged in a staggered configuration with respect to the inkjet heads of the first row. The staggered arrangement provides a page wide array of nozzles which are substantially equidistant in the length direction of the inkjet marking device. The staggered configuration may also provide a redundancy of nozzles in the area where the inkjet heads of the first row and the second row overlap, see 70 in FIG. 2B. Staggering may further be used to decrease the nozzle pitch (hence increasing the print resolution) in the length direction of the inkjet marking device, e.g. by arranging the second row of inkjet heads such that the positions of the nozzles of the inkjet heads of the second row are shifted in the length direction of the inkjet marking device by half the nozzle pitch, the nozzle pitch being the distance between adjacent nozzles in an inkjet head, $d_{nozzle}$ (see FIG. 2C, which represents a detailed view of 80 in FIG. 2B). The resolution may be further increased by using more rows of inkjet heads, each of which are arranged such that the positions of the nozzles of each row are shifted in the length direction with respect to the positions of the nozzles of all other rows.

In image formation by ejecting an ink, an inkjet head (i.e. printhead) employed may be either an on-demand type or a continuous type inkjet head. As an ink ejection system, there may be usable either the electric-mechanical conversion system (e.g., a single-cavity type, a double-cavity type, a bender type, a piston type, a shear mode type, or a shared wall type), or an electric-thermal conversion system (e.g., a thermal inkjet type, or a Bubble Jet type (registered trade name)). Among them, it is preferable to use a piezo type inkjet recording head which has nozzles of a diameter of 30 µm or less in the current image forming method.

FIG. 1 shows that after pre-treatment, the receiving medium P is conveyed to upstream part of the inkjet marking module 11. Then, image formation is carried out by each color ink ejecting from each inkjet marking device 111, 112, 113 and 114 arranged so that the whole width of the receiving medium P is covered.

Optionally, the image formation may be carried out while the receiving medium is temperature controlled. For this purpose a temperature control device 19 may be arranged to control the temperature of the surface of the transportation mechanism (e.g. belt or drum) underneath the inkjet marking module 11. The temperature control device 19 may be used to control the surface temperature of the receiving medium P, for example in the range of 30° C. to 60° C. The temperature control device 19 may comprise heaters, such as radiation heaters, and a cooling means, for example a cold blast, in order to control the surface temperature of the receiving medium within said range. Subsequently and while printing, the receiving medium P is conveyed to the downstream part of the inkjet marking module 11.

Drying and Fixing

After an image has been formed on the receiving medium, the prints have to be dried and the image has to be fixed onto the receiving medium. Drying comprises the evaporation of solvents, in particular those solvents that have poor absorption characteristics with respect to the selected receiving medium.

FIG. 1 schematically shows a drying and fixing unit 20, which may comprise a heater, for example a radiation heater. After an image has been formed, the print is conveyed to and passed through the drying and fixing unit 20. The print is heated such that solvents present in the printed image, to a large extent water, evaporate. The speed of evaporation and hence drying may be enhanced by increasing the air refresh rate in the drying and fixing unit 20. Simultaneously, film formation of the ink occurs, because the prints are heated to a temperature above the minimum film formation temperature (MFT). The residence time of the print in the drying and fixing unit 20 and the temperature at which the drying and fixing unit 20 operates are optimized, such that when the print leaves the drying and fixing unit 20 a dry and robust print has been obtained. As described above, the transportation mechanism 12 in the fixing and drying unit 20 may be separated from the transportation mechanism of the pre-treatment and printing section of the printing apparatus and may comprise a belt or a drum.

Post Treatment

To increase the print robustness or other properties of a print, such as gloss level, the print may be post treated, which is an optional step in the printing process.

In an embodiment, the prints may be post treated by laminating the prints.

In an embodiment, the post-treatment step comprises a step of applying (e.g., by jetting) a post-treatment liquid onto the surface of the coating layer, onto which the inkjet ink has been applied, so as to form a transparent protective layer on the printed recording medium. In the post-treatment step, the post-treatment liquid may be applied over the entire surface of an image on the recording medium or may be applied only to specific portions of the surface of an image. The method of applying the post-treatment liquid is not particularly limited, and is selected from various methods depending on the type of the post-treatment liquid. However, the same method as used in the coating method of the pre-treatment liquid or an inkjet printing method is preferably used. Of these methods, inkjet printing method is particularly preferable in view of, avoiding contact between the printed image and the used post-treatment liquid applicator; the construction of an inkjet recording apparatus used; and the storage stability of the post-treatment liquid. In the post-treatment step, a post-treatment liquid containing a transparent resin is applied on the surface of a formed image so that a dry adhesion amount of the post-treatment liquid is 0.5 $g/m^2$ to 10 $g/m^2$, preferably 2 $g/m^2$ to 8 $g/m^2$, thereby forming a protective layer on the recording medium. When the dry adhesion amount is less than 0.5 $g/m^2$, almost no improvement in image quality (image density, color saturation, glossiness and fixability) is obtained. When the dry adhesion amount is more than 10 $g/m^2$, it is disadvantageous in cost efficiency, because the dryness of the protective layer degrades and the effect of improving the image quality is saturated.

As a post-treatment liquid, an aqueous solution comprising components capable of forming a transparent protective layer over a recording medium (e.g., a water-dispersible resin, a surfactant, water, and additives as required) is preferably used. The water-dispersible resin comprised in the post-treatment liquid, preferably has a glass transition temperature ($T_g$) of −30° C. or higher, and more preferably in the range of −20° C. to 100° C. The minimum film forming temperature (MFT) of the water-dispersible resin is preferably 50° C. or lower, and more preferably 35° C. or lower. The water-dispersible resin may be radiation curable to improve the glossiness and fixability of the image.

As the water-dispersible resin, for example, an acrylic resin, a styrene-acrylic resin, a urethane resin, an acryl-silicone resin, a fluorine resin and the like are preferably used. The water-dispersible resin can be suitably selected from the same materials as that used for the inkjet ink. The amount of the water-dispersible resin contained, as a solid content, in the protective layer is preferably 1% by mass to 50% by mass.

The surfactant comprised in the post-treatment liquid is not particularly limited and may be suitably selected from those used in the inkjet ink. Examples of the other components of the post-treatment liquid include antifungal agents, antifoaming agents, and pH adjustors.

Hitherto, the printing process was described such that the image formation step was performed in-line with the pre-treatment step (e.g. application of an (aqueous) pre-treatment liquid) and a drying and fixing step, all performed by the same apparatus (see FIG. 1). However, the printing process is not restricted to the above-mentioned embodiment. A method in which two or more machines are connected through a belt conveyor, drum conveyor or a roller, and the step of applying a pre-treatment liquid, the (optional) step of drying a coating solution, the step of ejecting an inkjet ink to form an image and the step or drying an fixing the printed image are performed. It is, however, preferable to carry out image formation with the above defined in-line image forming method.

EXAMPLES

Materials

All chemicals used in the examples were obtained from Sigma Aldrich, unless stated otherwise.

The used print media were obtained from:
Triple star gloss and Triple star matt obtained from Sappi;
TCPro-silk and TCPro gloss obtained from Océ.

Method for Determining the Water Fastness of Printed Matter

Figure 3A:
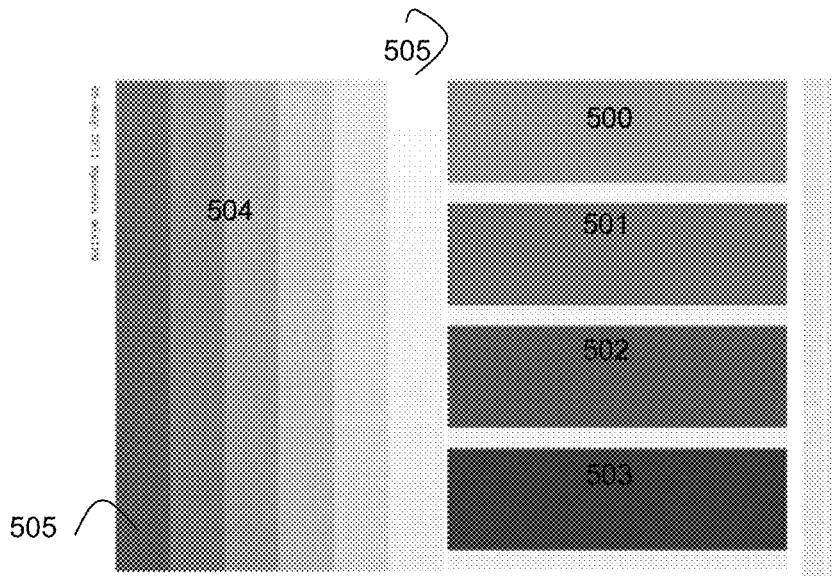
FIG. 3A shows a printed image of a pre-treatment composition.

For the purpose of showing the effect of the present invention, the pre-treatment compositions as described in the examples below were printed with a Kyocera print head type KJB4, operated at 25° C., for example in a pattern shown in FIG. 3A, wherein the greyscale is an indication for coverage of the print medium with the pre-treatment composition: The area's indicated with 500, 501, 502 and 503 correspond to printhead settings DS1 (dotsize), DS2, DS3 and DS4 respectively and these areas are printed with 100% coverage. Adjacent area 504 (left-hand side of FIG. 3A) comprises 10×6 squares which are printed with DS3 from 0% coverage (i.e., no primer, indicated with 505) to 100% coverage (i.e. full surface printed with primer, indicated with 506) with equidistant coverage steps (i.e. 100/(60−1)≈1.7% per step).

In a second step an ink layer was applied by means of rod coating a 14 μm ink layer.

In a third step the print was dried for 2 seconds at a temperature of 70° C.

In a fourth step the printed matter was rinsed under warm (50-60° C.) tab water.

Figure 3B:
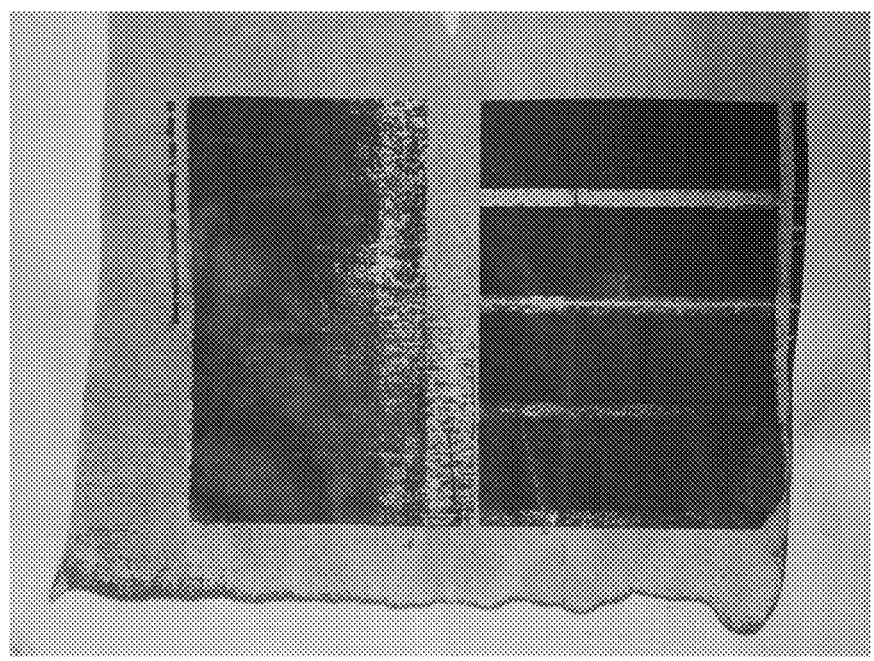
FIG. 3B shows a rinsed sample of printed matter with the printed image of a pre-treatment composition according to FIG. 3A with and ink composition rod coated on top of the pre-treatment composition.

An example of a result is shown in FIG. 3B. Finally for in the context of the present invention, the appearance of the ink layer after rinsing was visually detected.

Preparation Example i: Preparation of Pre-Treatment Composition According to the Prior Art 30 g. magnesiumnitrate hexahydrate (Mw=256.4 g/mol) (equivalent to 17.4 g. $MgNO_3$ (Mw=148.3 g/mol) and 12.6 g. water); 39.2 g. water; 30 g. glycerine, 1.3 g. Tomamine™ (CAS nr 64972-19-6, monosodium salt of decycloxypropyl-3-iminodipropionic acid form Air products) and 0.5 g. Dynol 607 (a polyether modified acetylene glycol surfactant obtained from Air Products) were mixed and filtered over a 1 μm Pall filter in order to obtain a jettable pre-treatment composition with the following composition:
17.2 wt % $MgNO_3$; 51.3 wt % water; 29.7 wt % glycerine; 1.3 wt % Tomamine™; and 0.5 wt % Dynol 607.

Preparation Example ii: Preparation of Pre-Treatment Composition According to the Present Invention 80 g. 2,5,7,10-tetra-oxa-undecane TOU (supplier: Lambiotte); 20 g. Polyethyleneglycol with a molar mass of 400 g/mol (PEG400, supplier: Fluka) and 20 g. diglycolic anhydride were mixed and filtered over a 1 µm Pall filter in order to obtain a jettable pre-treatment composition with the following composition:

66.7 wt % TOU; 16.7 wt % PEG400 and 16.6 wt % dyglicolicanhydride

The obtained pre-treatment composition can be jetted at 25° C.

Preparation Example iii: Preparation of Model Liquid 15 g. of Carboset GA2363E (40 wt % alkali soluble acrylic copolymer emulsion in water, obtained from Lubrizol) and 85 g. demineralized water were mixed and Vantex®-T (alkanolamine obtained from Taminco) was added until the pH of the mixture was 8.0.

Preparation Examples iv-vi: Preparation of Ink Compositions 1-3

The ingredients shown in Table 1 below were mixed and filtered over a 1 µm Pall filter in order to obtain jettable ink compositions having the composition also shown in Table 1.

Comparative Example A: Solubility of Alkali Soluble Latex Resin when Contacted with Pre-treatment Composition According to the Prior Art 5 g of the model liquid obtained in preparation example iii was stirred in a jar and while stirring 0.1 g of pre-treatment composition obtained in preparation example i was added. The result is shown in the left jar 600 in the picture shown in FIG. 4. No precipitates were formed, indicating that the alkali soluble resin present in the model liquid remains solved, also after adding the pre-treatment composition according to the prior art. Therefore, a combination of an ink comprising an alkali soluble latex resin and a traditional pre-treatment composition cannot provide a significant improvement of the water fastness of printed matter made with such pre-treatment composition and ink.

Example 1: Solubility of Alkali Soluble Latex Resin when Contacted with Pre-treatment Composition According to the Present Invention Comparative Example A was repeated but the pre-treatment composition obtained in preparation example ii was used instead of pre-treatment composition obtained in preparation example i.

Figure 4:
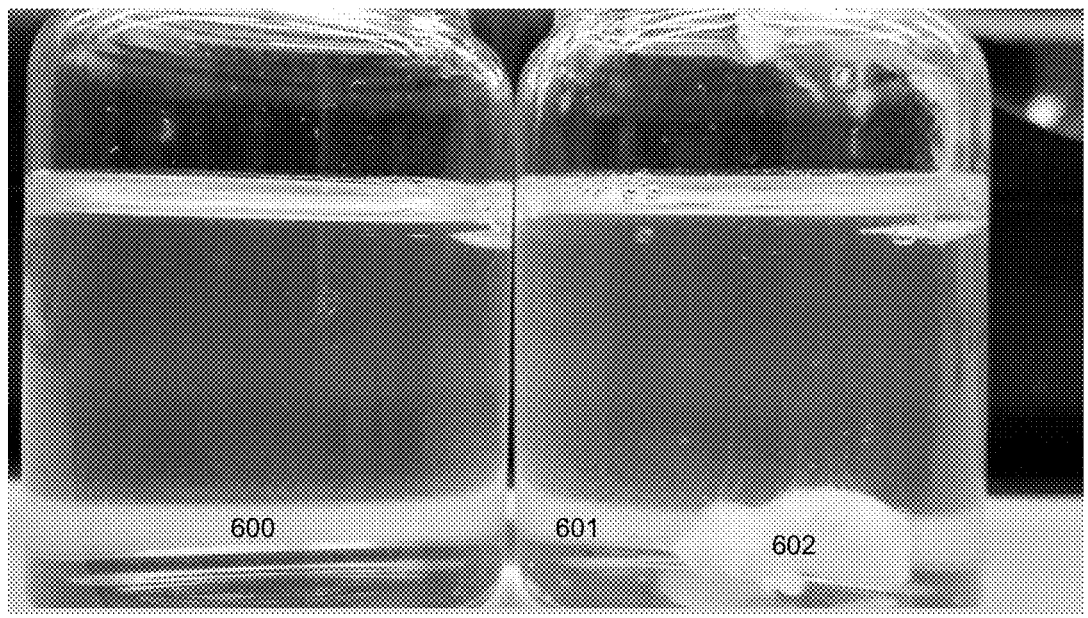
FIG. 4 shows a photograph of the results of Comparative Example A and Example 1.

The result is shown in the right jar 601 in the picture shown in FIG. 4. Precipitates 602 were formed, indicating that the alkali soluble resin present in the model liquid separates from the solution after adding the pre-treatment composition according to the present invention. Therefore, a combination of an ink comprising an alkali soluble latex resin and a pre-treatment composition according to the present invention can provide a significant improvement of the water fastness (due to decreased solubility of the alkali soluble latex resin) of printed matter made with such pre-treatment composition and ink.

TABLE 1 compositions of inks 1-3 as prepared in preparation examples iv-vi respectively.

| Component | ink 1 mass (g) | ink 1 wt % | ink 2 mass (g) | ink 2 wt % | ink 3 mass (g) | ink 3 wt % |
|---|---|---|---|---|---|---|
| Neocryl ® XK205[1] | 24.7 | 9.9[8] | — | — | — | — |
| Neocryl ® A662[2] | — | — | 17.6 | 7.05[8] | — | — |
| Carboset GA2363E[3] | — | — | 4.5 | 1.8[8] | 7.5 | 3[8] |
| Pro-Jet™ APD1000 C[4] | 14.9 | 2.2[8] | 15.0 | 2.25[8] | 20.0 | 3[8] |
| ML190[5] | 3.3 | 1.2[8] | 3.3 | 1.16[8] | — | — |
| betaine[6] | 12.5 | 12.5 | 11.4 | 11.4 | 12.0 | 12.0 |
| glycerol | 12.6 | 12.6 | 11.6 | 11.6 | 12.0 | 12.0 |
| TOU | — | — | 4.0 | 4.0 | — | — |
| Vantex ®-T[7] | 0.5 | 0.5 | 0.5 | 0.5 | 1.5 | 1.5 |
| surfactant (mix) | 3.6 | 3.6 | 1.9 | 1.9 | 1.5 | 1.5 |
| anti-biotic additives | 0.2 | 0.2 | 0.2 | 0.2 | — | — |
| water | 27.8 | 57.3[9] | 29.9 | 58.1[9] | 45.5 | 67[9] |
| total | 100.1 | 100 | 99.9 | 100 | 100 | 100 |

[1] Obtained form DSM, comprising 40 wt % polymer
[2] Obtained from DSM, comprising 40 wt % polymer
[3] Obtained from Lubrizol, comprising 40 wt % solids
[4] 15 wt % Cyan pigment dispersion obtained from FujiFilm
[5] 35 wt % ML190E wax dispersion obtained from Michelman
[6] trimethylglycine obtained from Weifan Sunwin
[7] pH modifying additive (alkanolamine) obtained from Taminco
[8] wt % solids (i.e. resin, pigment) with reference to the total ink composition.
[9] including water from dispersions (latices, pigment and wax)

Comparative Example B: Preparing a Print with a Pre-treatment Composition According to the Prior Art A 4 µm layer of the pre-treatment composition obtained in preparation example i was rod coated on Triple star gloss print substrate. Subsequently a 14 µm layer of ink composition obtained in preparation example vi (ink 3) was applied on top of the primer and directly on the medium. Without drying, the samples comprising pre-treatment composition and ink are immediately rinsed with warm (50-60° C.) tab water.

Example 2: Preparing a Print with a Pre-treatment Composition According to the Present Invention Comparative Example B was repeated with pre-treatment composition obtained in preparation example ii instead of the pre-treatment composition of preparation example i.

Figure 5:
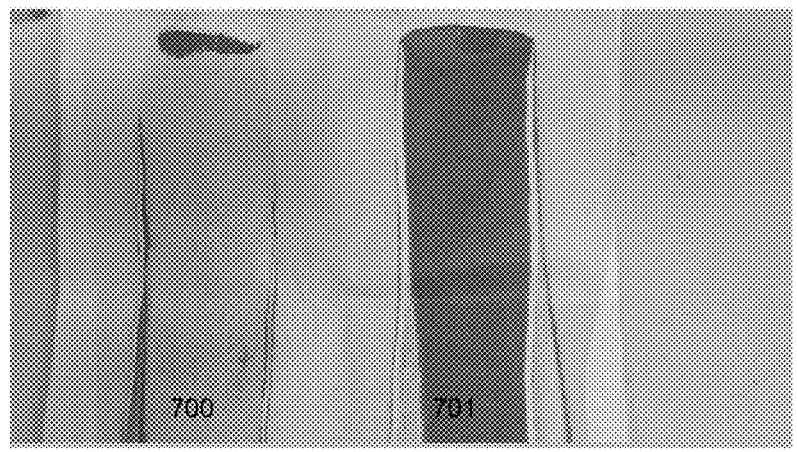
FIG. 5. shows the water fastness of a print made with an ink and a pre-treatment composition according to the prior art (left) and of a print made with said ink and a pre-treatment composition according to the present invention (right).

FIG. 5 shows the results of Comparative Example (left, 700) and Example 2 (right, 701). It can be seen in FIG. 5 that the areas where no pre-treatment composition was applied are almost completely blank after rinsing. Therefore, the used ink as such has a low water fastness. When a pre-treatment composition according to the prior art is used (left side in FIG. 5), the water fastness hardly improves (e.g. almost all ink is washed away, a low optical density (OD) remains after rinsing). When a pre-treatment composition according to the present invention is used (right side) the water fastness of the printed matter significantly improves (e.g. almost no ink is washed away, a high OD remains after rinsing).

Thus, when using a pre-treatment composition according to the present invention in combination with an ink that has an intrinsic low water fastness, the water fastness significantly improves, even without drying the print first.

Without wanting to be bound to any theory it is believed that this is caused by reaction of the latex resin with the acids liberated from the acid anhydrides in the pre-treatment composition upon contact with water such that the latex resin changes from a soluble to an insoluble form as demonstrated in Comparative Example A and Example 1.

Example 3: Determining the Optimal Pre-treatment Coverage for Obtaining Maximum Water Fastness The method for determining the water fastness of printed matter described above was performed with the pre-treatment composition according to the present invention as obtained in preparation example ii and ink 2 (see Table 1).

It can be seen that there is an optimal range in pre-treatment coverage. At very low coverage (i.e. 25% or below, DS3, see left-hand side of FIGS. 3A and 3B) the ink is at least partly washed away (low water fastness). At very high coverage (i.e. ≈85-100%, DS3, see lefhand side of FIGS. 3A and 3B and 502 in FIG. 3A and the corresponding printed area in FIG. 3B) smudging of the ink is detected, indicating that the water fastness may not be optimal or the robustness (e.g. smear resistance) is inferior.

The optimal range of coverage with pre-treatment composition is dependent on the selected medium, pre-treatment composition and ink composition combination.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims is herewith disclosed.

Further, the terms and phrases used herein are not intended to be limiting; but rather, to provide an understandable description of the invention. The terms "a" or "an", as used herein, are defined as one or more than one.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A pre-treatment composition for use in combination with an aqueous alkaline ink composition comprising an alkali soluble latex resin and/or a latex resin having an acid number of between 15 mg KOH/g and 130 mg KOH/g, the pre-treatment composition comprising:
   an organic matrix comprising at least one organic solvent that is miscible with water;
   at least one selected from an acid or acid anhydride that is soluble in the organic matrix, wherein the pre-treatment composition is substantially free of water.

2. The pre-treatment composition according to claim 1, wherein the at least one organic solvent of the organic matrix is selected from the group consisting of:
   2,5,7,10-tetra-oxa-undecane; isosorbide; dimethylether; n-butyl pyrrolidone; 1-methyl-2-pyrrolidone; diethyleneglycoldimethylether, propylenecarbonate; dimethylsulfoxide; and dimethylformamide.

3. The pre-treatment composition according to claim 1, wherein the pre-treatment composition comprises the acid, which is selected from the group consisting of p-toluene sulfonic acid; maleic acid; oxalic acid; tartaric acid; and oligo lactic acid.

4. The pre-treatment composition according to claim 1, wherein pre-treatment composition comprises the acid anhydride, which is selected from the group consisting of diglycolic anhydride; benzoic anhydride; maleic anhydride, glutaric anhydride and succinic anhydride.

5. The pre-treatment composition according to claim 1, further comprising at least one viscosity modifier selected from the group consisting of: polyvinyl pyrrolidone; poly (2-ethyl-2-oxazoline); and (dimethyl) polyethyleneglycols (PEG) in a molar mass range of 200-10000 g/mol.

6. A kit of parts, comprising:
   a pre-treatment composition according to claim 1; and
   an aqueous ink composition comprising an alkali soluble latex resin and/or a latex resin having an acid number of between 15 mg KOH/g and 130 mg KOH/g, the aqueous ink composition having a pH of above 7.

7. A method of printing, comprising the steps of:
   a) providing a substantially water free pre-treatment composition, comprising an organic matrix comprising at least one organic solvent that is miscible with water and at least one selected from an acid or an acid anhydride that is soluble in the organic matrix;
   b) providing an aqueous ink composition, comprising an alkali soluble latex resin and/or a latex resin having an acid number of between 15 mg KOH/g and 130 mg KOH/g, the aqueous ink composition having a pH of above 7;
   c) providing a print medium;
   d) applying the pre-treatment composition onto the print medium to obtain a pre-treated print medium; and
   e) printing an image with the aqueous ink composition onto the pre-treated print medium.

8. The method according to claim 7, further comprising the step of:
   f) drying of the pre-treated print medium obtained in step d.

9. The method according to claim 7, further comprising the step of:
   g) drying of the printed and pre-treated print medium obtained in step e.

10. The method according to claim 7, wherein the pre-treatment composition is applied with ink jet printing.

11. The method according to claim 7, wherein the pre-treatment composition is applied at room temperature.

12. The method according to claim 7, wherein the pre-treatment composition is applied to the print medium with a coverage in a range between 15% and 85% of the surface area of the print medium.

* * * * *